United States Patent
Ganpaul et al.

(10) Patent No.: US 6,208,727 B1
(45) Date of Patent: Mar. 27, 2001

(54) METHOD OF ALERTING APARTMENT RESIDENTS TO THE ARRIVAL OF VISITORS

(75) Inventors: Nyron Anaud Ganpaul, Ottawa; Foad Mojgani, Nepean, both of (CA)

(73) Assignee: Nortel Networks Corporation, Montreal (CA)

( * ) Notice: Subject to any disclaimer, the term of this patent is extended or adjusted under 35 U.S.C. 154(b) by 0 days.

(21) Appl. No.: 09/062,647

(22) Filed: Apr. 17, 1998

(51) Int. Cl.[7] ............................ H04M 3/58; H04M 11/00; H04M 7/00
(52) U.S. Cl. ...................... 379/215; 379/102.06; 379/230
(58) Field of Search ........................ 379/93.35, 102.06, 379/201, 207, 215, 230, 252, 373, 208, 218

(56) References Cited

U.S. PATENT DOCUMENTS

| | | | |
|---|---|---|---|
| 3,947,641 | * | 3/1976 | Trell ........................ 379/102.06 X |
| 5,953,407 | * | 9/1999 | Zhang et al. ........................ 379/373 |

* cited by examiner

Primary Examiner—Harry S. Hong

(57) ABSTRACT

An apartment building alerting system and method are disclosed which use the Public Switching Telephone Network (PSTN) to alert and connect visitors to residents. The PSTN system generally has a visitor interface unit located in the apartment building and is connected over a regular telephone line to a telephone switch located at an end office which serves the local area. The visitor interface unit also includes an auto dialler which takes a resident name, an apartment number or some other means for identifying a particular resident of the apartment building and translates it into a PSTN directory number (DN) associated with the telephone physically located in the resident's apartment. To contact a particular resident a visitor uses the visitor interface to identify a particular resident and the auto dialler proceeds to dial a corresponding PSTN DN associated with the resident. Where the resident answers the call the telephone switch connects the visitor with the resident over the PSTN. The PSTN alerting method uses a Call Waiting Origination switch service in combination with an Advanced Intelligent Network (AIN) supported distinctive signalling service to provide residents with distinctive ringing and with distinctive call waiting services on calls originating from visitor interface.

13 Claims, 5 Drawing Sheets

METHOD OF ALERTING APARTMENT RESIDENTS TO THE ARRIVAL OF VISITORS

FIELD OF THE INVENTION

This invention relates to apartment building alerting systems and in particular to a method that uses the public switching telephone network to alert and connect visitors to residents.

BACKGROUND TO THE INVENTION

Apartment buzzer or alerting systems have existed for many years and serve to alert a resident of the Apartment building of the arrival of a visitor to the main lobby area. Existing alerting systems use the Public Switching Telephone Network (PSTN) in various ways to alert the resident to the arrival of a visitor. One example of such a system is often referred to simply as a PSTN Buzzer system. The PSTN system generally has a visitor interface unit located in the apartment building and is connected over a regular telephone line to a telephone switch located at an end office which serves the local area. The visitor interface unit also includes an auto dialler which takes a resident name, an apartment number or some other means for identifying a particular resident of the apartment building and translates it into a PSTN directory number (DN) associated with the telephone physically located in the resident's apartment. To contact a particular resident a visitor uses the visitor interface to identify a particular resident and the auto dialler proceeds to dial a corresponding PSTN DN associated with the resident. Where the resident answers the call the telephone switch connects the visitor with the resident over the PSTN. Residents may allow visitors entry to the building by keying in a predetermined Dual Tone Multi-Frequency (DTMF) sequence which is detected by the visitor interface unit and used to unlock the lobby door. However, where the resident is already using his or her telephone, the visitor generally receives a busy tone leaving the resident unaware that a visitor is waiting in the lobby. Although an inexpensive system to install mainly for reasons that internal apartment wiring is virtually non-existent, residents can not distinguish visitor calls from regular calls and often are not able to be made aware of waiting visitors if they happen to be using their telephone at the time the visitor calls from the lobby.

A further more elaborate apartment building alerting system which does not directly use the PSTN to alert residents to the arrival of visitors is also in existence today. Such systems are often referred to as direct wired buzzer systems. Direct wired systems generally include a Line Interface Board (LIB) which is located at the apartment building and which terminates all individual telephone lines from the PSTN associated with DNs of respective residents in the apartment building. The LIB also includes direct wired connections internal to the apartment building directly to a telephone in each apartment. In such a system any incoming call from the PSTN to any resident of the apartment building, regardless of who or where the originator is, must be routed through the LIB. All calls originating from resident telephones and destined for the PSTN also must be routed through the LIB. A direct connection is provided from the LIB to a lobby located visitor interface and in a similar manner to the PSTN Buzzer system described above the visitor interface in response to a keyed entry, translates a resident name or an apartment number to a number associated with the corresponding resident telephone. The LIB then alerts the corresponding resident telephone over the direct wired internal connections without the need to route the call over the PSTN. When the call is answered by the resident a connection is made through the LIB between the visitor and the resident. To facilitate distinguishing visitor calls from regular PSTN incoming calls it is common for LIBs to be capable of applying a ringing signal to the resident telephone which is distinct from normal PSTN ringing signals. With limited service logic in the LIB, the direct wired buzzer system is able to apply for example a call waiting signal to alert a resident of a visitor any time the resident is on the telephone at the time a visitor calls. Despite the advantages of the direct wired system, the added initial expense of having to purchase a Line Interface Board as well as providing connections between it and every apartment telephone can easily make this system in the order of six times more expensive than the simple PSTN buzzer system just described. Apart from the initial high purchase price of such a system, all maintenance, servicing and upgrading costs also have to be absorbed by the owners of the apartment building. It is well known that service provider networks are designed to be extremely reliable and hence a further concern to residents is that because all of their telephone lines must interface directly with the LIB, their regular telephone service now depends on the integrity of this piece of third party equipment.

SUMMARY OF THE INVENTION

The invention seeks to provide an improved PSTN method of alerting residents of an apartment building to the arrival of visitors. In one aspect of the invention there is provided a method of alerting residents of a building comprising the steps of terminating on a switch a first telephone line associated with a visitor interface; provisioning a call waiting origination switch service against the first telephone line; in response to receiving at said switch a call to a Called Party originating on said first telephone line, the switch invoking said provisioned call waiting origination switch service; and in response to determining that a second telephone line associated with the Called Party is busy, switch logic associated with said call waiting origination switch service then causing said switch to apply a call waiting indication to the second telephone line.

In accordance with another aspect of the present invention there is provided a telephony switch interconnecting with a building visitor interface by way of a telephone line, the telephony switch configured to provide a call waiting origination service for the telephone line, enabling all telephone calls originating with the visitor interface to residents of the building to initiate provision of call waiting indications.

Residents and owners both benefit from a PSTN apartment building alerting system in accordance with the invention. Owners of apartment buildings realize a cost savings over the direct wired systems while still being able to provide their residents with a PSTN system which is capable of providing a call waiting indication service on all calls originated by visitors even in instances when residents do not have an individual call waiting service provisioned against their respective lines. With a PSTN apartment building alerting system in accordance with the invention residents will receive a call waiting indication if a visitor attempts to call them while they are busy using their telephone line.

Advantageously the method further comprises the step of determining that said first line subscribes to a distinctive signalling service and in response to determining that the second telephone line is busy, the switch logic causing said switch to apply a distinctive call waiting indication to the second telephone line. Providing a distinct call waiting tone allows residents who are on the phone to realize prior to even taking the incoming call that the incoming call signifies a waiting visitor and allows them to act accordingly.

Conveniently the method further comprises the step of determining that said first line subscribes to a distinctive signalling service and in response to determining that the second telephone line is idle, the switch logic causing said switch to apply a distinctive ringing signal to the second telephone line. Providing a distinctive ringing signal allows residents who are in their residence but not on their phone to realize prior to even taking the incoming call that the incoming call signifies a waiting visitor and allows them to act accordingly.

BRIEF DESCRIPTION OF THE DRAWINGS

The invention will be further understood from the detailed description and with reference to the figures in which.

DETAILED DESCRIPTION

Figure 1:
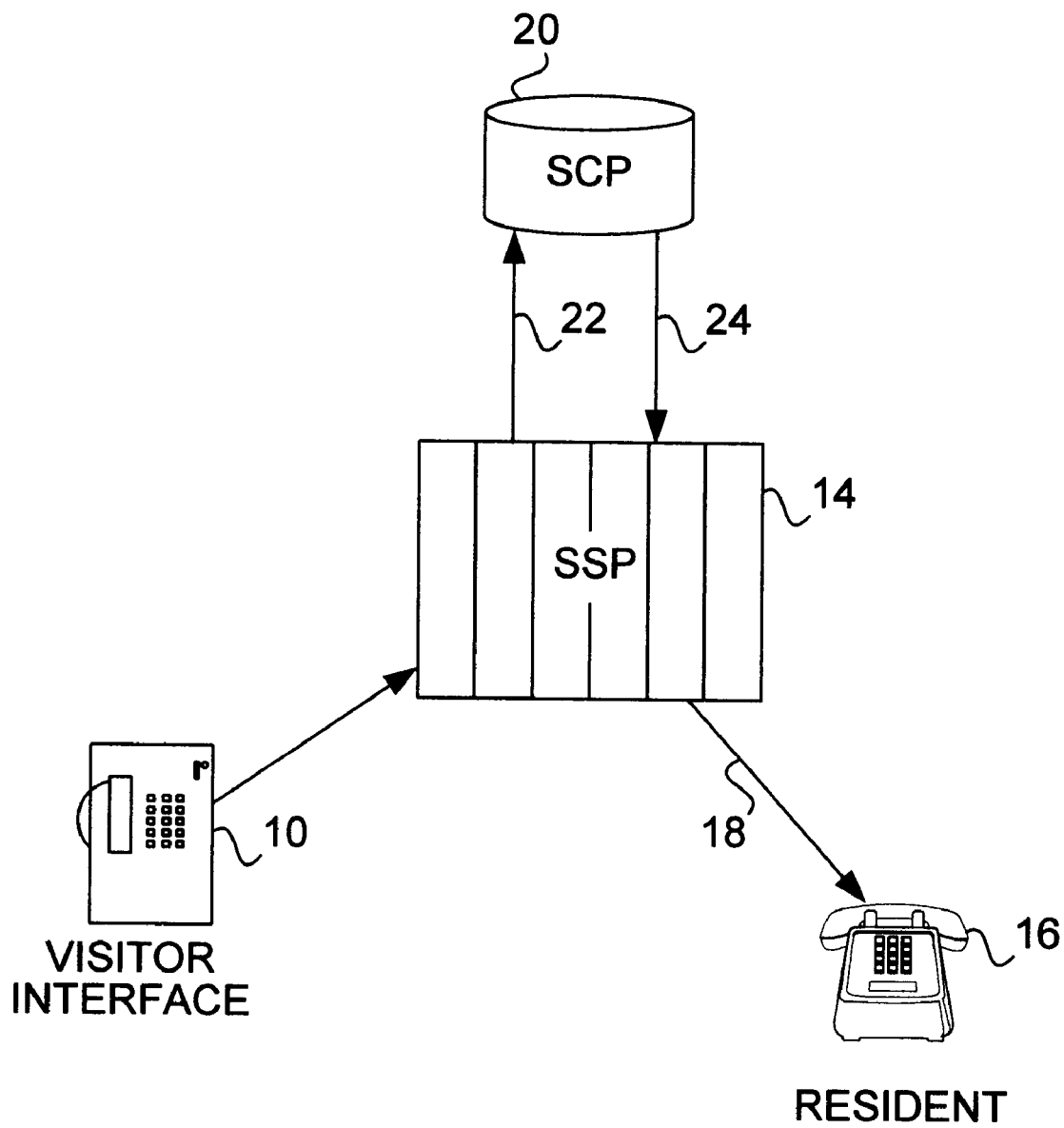
FIG. 1 illustrates a PSTN apartment building alerting system.

The Intelligent Network (IN) architecture has been evolved through the efforts of various groups, in particular Bellcore, European 30 Telecommunications Standards Institute (ETSI), International Telecommunications Union (ITU-T), and American National standards Institute (ANSI). These groups have issued respective documentation defining the general Intelligent Network architecture along with the various entities found within the Network. Advanced Intelligent Network (AIN) is another industry term for the Intelligent Network (IN).

Generally known telecommunication intelligent network entities in existence today along with other terms used in the detailed description are briefly described in general terms below:

SSP: (Service Switching Point) That node in an Intelligent Network normally associated with an end office and equipped with AIN software. A SSP is generally a central office switch enhanced with CCS7 messaging links and AIN software which permit it to communicate with application data bases such as Service Control Points (SCPs). Pre-defined Call Processing Triggers in the SSP AIN software result in the SSP initiating queries to network SCP's for information regarding completing call processing of a particular call.

SCP: (Service Control Point) A centralized network element in the Intelligent Network that individual switches call upon to obtain information and commands necessary for completing an AIN call. The SCP is the intelligence center in an CCS7 AIN network which processes queries for information and returns a response to the originator of the query.

Switch service: A service capable of being implemented entirely by a switch (SSP) without the need for any off switch call processing.

Call Waiting Origination Switch Service: A switch service which is provisioned against a line and provides each called party of an incoming call on the provisioned line with a call waiting service and only for calls which originate from the provisioned line.

AIN based service: A service which requires some off switch processing.

Originating line trigger: A trigger which causes a switch (SSP) to query a database (SCP) every time a call is made from the line that originated the call.

Visitor: A visitor is any person who arrives at a lobby of an apartment building and who intends to make their arrival known to a particular resident of the building.

Resident: A resident is generally any person who occupies an apartment within the building.

Visitor Interface: A unit typically located in the lobby of an apartment building and which is connected to the PSTN. The visitor interface includes an auto-dialler and is capable of receiving keyed entries corresponding to a resident name, an apartment number or some other means for identifying a particular resident of the apartment building and translating them into a PSTN directory number (DN) associated with the telephone physically located in the resident's apartment. The auto-dialler is capable of initiating calls to the corresponding DN over the PSTN.

Owners of apartment buildings generally desire and prefer visitor alerting systems which use the PSTN for reasons of low initial cost and because someone else, i.e. a service provider is responsible for maintaining the majority of the system. Residents on the other hand often prefer direct wired systems for reasons of their added service features.

FIG. 1 illustrates a PSTN apartment alerting system which is capable of providing owners with a low cost system while still being able to provide residents with desirable features normally associated with the more expensive direct wired systems. A visitor interface 10 which includes an auto dialler, is typically located in the lobby area of an apartment building and is shown connected over a PSTN line 12 (the visitor interface line) to an end office switch, SSP 14. The visitor interface line 12 has a Directory Number (DN) associated with it and terminates on SSP 14. A telephone 16 associated with a resident of the apartment building is shown connected to SSP 14 over PSTN line 18 (the resident line). The resident line 18 also has a Directory Number (DN) associated with it and terminates on SSP 14. SSP 14 communicates over Common Channel Signalling System # 7 (CCS7) messaging links 22,24 to an applications data base generally known as a Service Control Point 20 (SCP). Pre-defined Call Processing Triggers in the SSP 14 AIN software result in the SSP 14 initiating queries to the SCP 20 for information regarding completing call processing of a particular call.

In operation it is desirable with a PSTN alerting system that residents of an apartment building be alerted to the arrival of visitors even when they happen to be using their phone for an other call at the time a visitor wishes to call them. Although it is common place for service providers to offer and provision a call waiting (CWT) service against individual residence lines it is a simple fact that the CWT service is a subscription or optional service and hence it is not a service which has been or can be expected to be ubiquitous throughout the residential market. Therefore with current individual residential CWT service offerings, only those residents (of the apartment building) which subscribe individually to such a service will be alerted to an incoming visitor call should they be on an other call at the time the visitor calls them. To avoid the undesirable requirement of mandating subscribers be individually subscribed to a service providers CWT service, the invention provides for a Call Waiting Origination service to be provisioned against the visitor interface line 12. Having the Call Waiting Origination service provisioned in this manner would effectively result in each and every resident apartment line having a call waiting service for calls originating from the visitor interface 10, without the need for individual subscriptions. In operation, every time a 'called party' of an incoming call which originates from the visitor interface 10 (which can only be an apartment resident DN) is determined to be busy, that resident would receive a call waiting indication. The resident while on a call would therefore be alerted of an incoming call from the visitor interface 10 and if they choose to take the call, would then be made aware of the waiting visitor. For residents without a CWT service provisioned against their respective lines they would not receive a call waiting indication on any incoming call other than from the visitor interface 10.

Although Call Waiting Origination is and has been a service developed for use by Centrex users, residential customers are now demanding enhanced features for their telephone service and it is therefore desirable to allow the Call Waiting Originating service to also be assigned to non-Centrex (i.e. residential) lines. Once the advantages of making such a service provisionable against residential lines are realized, the switch development required to achieve this would firstly consist of removing software restrictions which currently prevent this service from being assigned to non-Centrex lines along with removing a second restriction which currently prevents the service from working for incoming calls made to DNs not belonging to a Centrex group. In summary the development would require the removal of known software restrictions and not of adding or developing new features.

Figure 2:
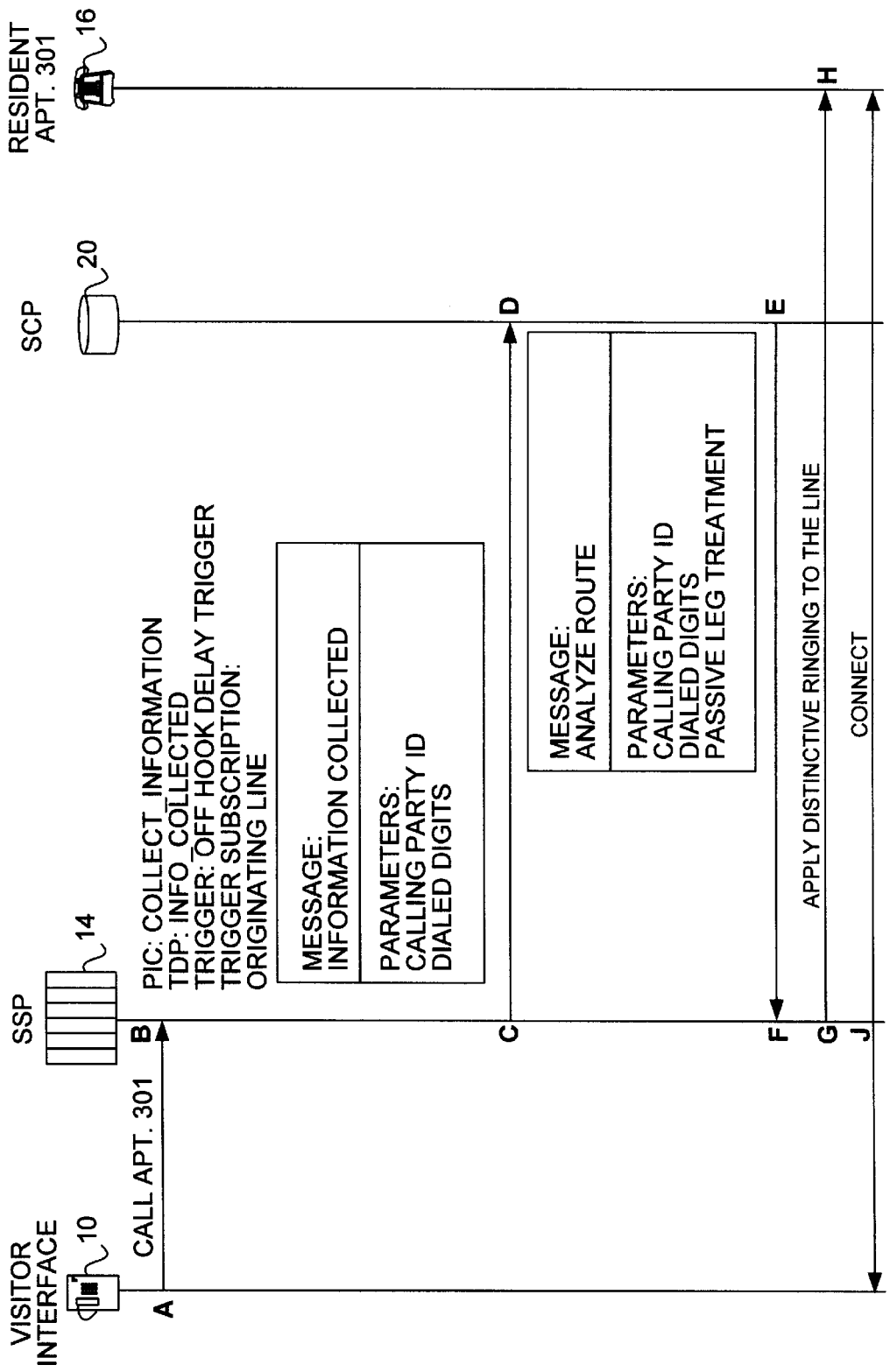
FIG. 2 represents a call flow of a PSTN alerting system of a preferred embodiment of the invention and for a scenario where an apartment resident is not on their phone at the time a visitor attempts to call them.

As AIN currently supports distinctive signaling services such as distinctive ringing and distinctive call waiting, the PSTN apartment alerting system advantageously in a preferred embodiment uses these AIN supported services in combination with the switch based CWT Origination service. Call flows of the preferred embodiment found in FIG. 2 and in FIG. 3, respectively provide for distinctive ringing and for distinctive call waiting services to residents for each incoming visitor call. Customer premise equipment (10, 16) and network equipment (14,20) of FIG. 1 are located across the top of FIG. 2 and FIG. 3 and for both call flows it is assumed that Call Waiting Origination service is provisioned at SSP 14 against the visitor interface line 12. FIG. 2 illustrates a call flow between a visitor to an apartment building and a resident of apartment number 301, and will now be described in conjunction with reference to the system of FIG. 1. A visitor arrives in the lobby of the apartment building and using the visitor interface 10 keys in a resident name, an apartment number or some other means for identifying the resident of apartment 301. The visitor interface 10 includes an auto dialler unit which translates the keyed entry into a PSTN directory number associated with the resident telephone 1 6 in apartment 301. The auto dialler at step 'A', using the DN then initiates a PSTN call to the resident telephone 16 over the visitor interface line 12 (FIG. 1). The switch, SSP 14, receives the incoming call over the visitor interface line 12 and in known manner determines that switch service 'Call Waiting Origination' is provisioned against the originating visitor interface line 12. With just the switch service provisioned all 'called parties' associated with incoming calls, which can only be DNs of apartment residents, would receive regular ringing (alerting) or if busy, they would receive a regular call waiting indication because of the CWT origination service. To achieve distinctive ringing or distinctive call waiting, AIN services are invoked at SSP 14 by also provisioning an AIN trigger against the originating line, i.e. the visitor interface line 12. The trigger chosen should allow the call to continue call processing using the original digits that were dialled and invoke a response message from the SCP 20 which contains a parameter which directs the SSP 14 to apply a distinctive signalling pattern to the 'called party', i.e. the resident DN. SSP 14 CWT origination service logic would interpret the distinctive signalling pattern parameter to be distinctive ringing or distinctive call waiting depending on the state of the line associated with the resident. The trigger must also be provisioned or assigned to the originating line (associated with the visitor interface) to ensure that this service is invoked only on calls which originate from the visitor interface 10. As many of today's networks have adopted the AIN architecture, the Off_Hook_Delay trigger has been used as the preferred AIN originating line trigger provisioned at SSP 14. In response to SSP 14 reaching a predefined Trigger Detection Point (TDP) associated with the Off_Hook_Delay trigger in the call processing of the incoming call, SSP 14 at step 'C' initiates an AIN 'Information Collected' message having as parameters: Calling Party ID=DN of Visitor Interface; and Dialled Digits=DN of Apartment 301. SCP 20 receives the 'Information Collected' message at 'D' and determines through a look up table that the Calling Party DN (i.e. DN of the visitor interface 10) contained in the message subscribes to the PSTN apartment distinctive signalling service and correspondingly returns at step 'E' an AIN 'Analyze Route' message having as parameters: Calling Party ID=DN associated with visitor interface; Dialled Digits=DN of Apartment 301; and Passive Leg Treatment=Distinctive Alerting Sequence. The 'Analyze Route' message is received by the SSP 14 at 'F' where switch service logic associated with the Call Waiting Origination service after determining that the resident line 18 is idle, uses the Passive Leg Treatment parameter to at step 'G' apply distinctive ringing to the line 18 associated with apartment 301. At 'H' the resident telephone 16 receives distinctive ringing and at some point thereafter the resident of apartment 301 associates the distinctive ringing with a waiting visitor and answers the call. In conventional manner SSP 14 detects an off hook condition and proceeds at step 'J' to connect the visitor with the resident of apartment 301. The resident of apartment 301 at any time thereafter may allow the visitor entry to the building by keying in a predetermined DTMF sequence which is detected by the visitor interface 10 and used to unlock the lobby door. When either party goes 'on hook' SSP 14 proceeds in known manner to take down the connection.

Figure 3:
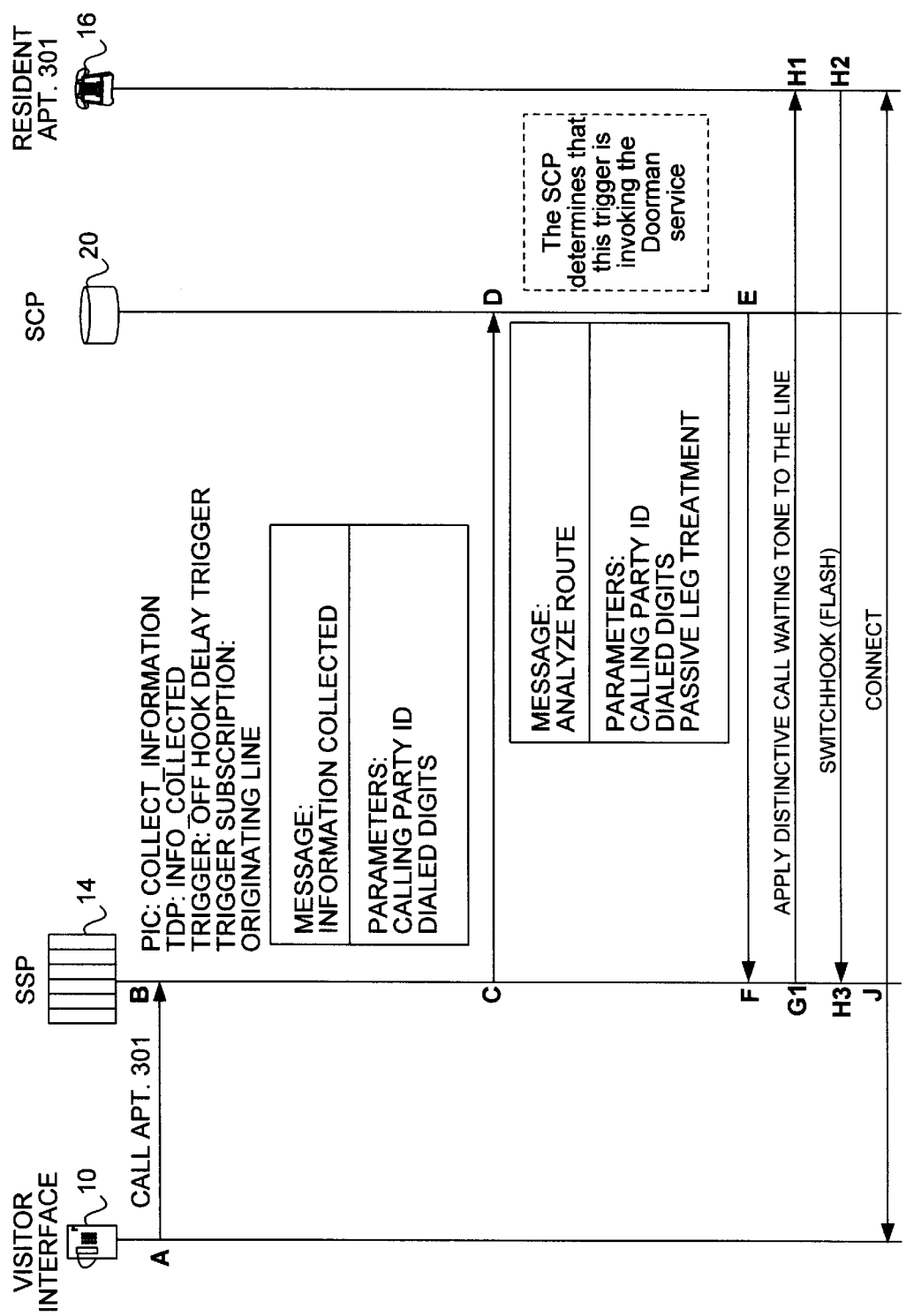
FIG. 3 represents a call flow similar to the call flow of FIG. 2 but for a scenario where the resident is busy on their phone at the time a visitor attempts to call them.

FIG. 3 represents a call flow which is similar to the call flow of FIG. 2 but is illustrative of how the switch based CWT origination service interacts with the returned AIN 'Analyze Route' message when SSP 14 determines resident line 18 to be busy. In a similar manner, steps A–F of FIG. 3 follow directly from the description above for steps A–F of FIG. 2. The 'Analyze Route' message is received by the SSP 14 at 'F' where switch service logic associated with the Call Waiting Origination service determines that the resident line 18 is now Busy, and correspondingly uses the Passive Leg Treatment parameter to at step "G1" to apply a distinctive call waiting indication to the resident line 18 associated with apartment 301. At 'H1' the resident telephone 16 receives the distinctive call waiting indication (generally a tone sequence) and at some point thereafter the resident of apartment 301 associating the distinctive call waiting indication with a waiting visitor, answers the call in known manner with a switchhook at step 'H2'. In conventional manner SSP 14 detects the switch hook condition H3 on the resident line 18 and proceeds at step 'J' to connect the visitor with the resident of apartment 301. The resident of apartment 301 at any time thereafter may allow the visitor entry to the building by keying in a predetermined DTMF sequence which is detected by the visitor interface 10 and used to unlock the lobby door. When either party goes 'on hook' SSP 14 proceeds in known manner to take down the connection.

Figure 4:
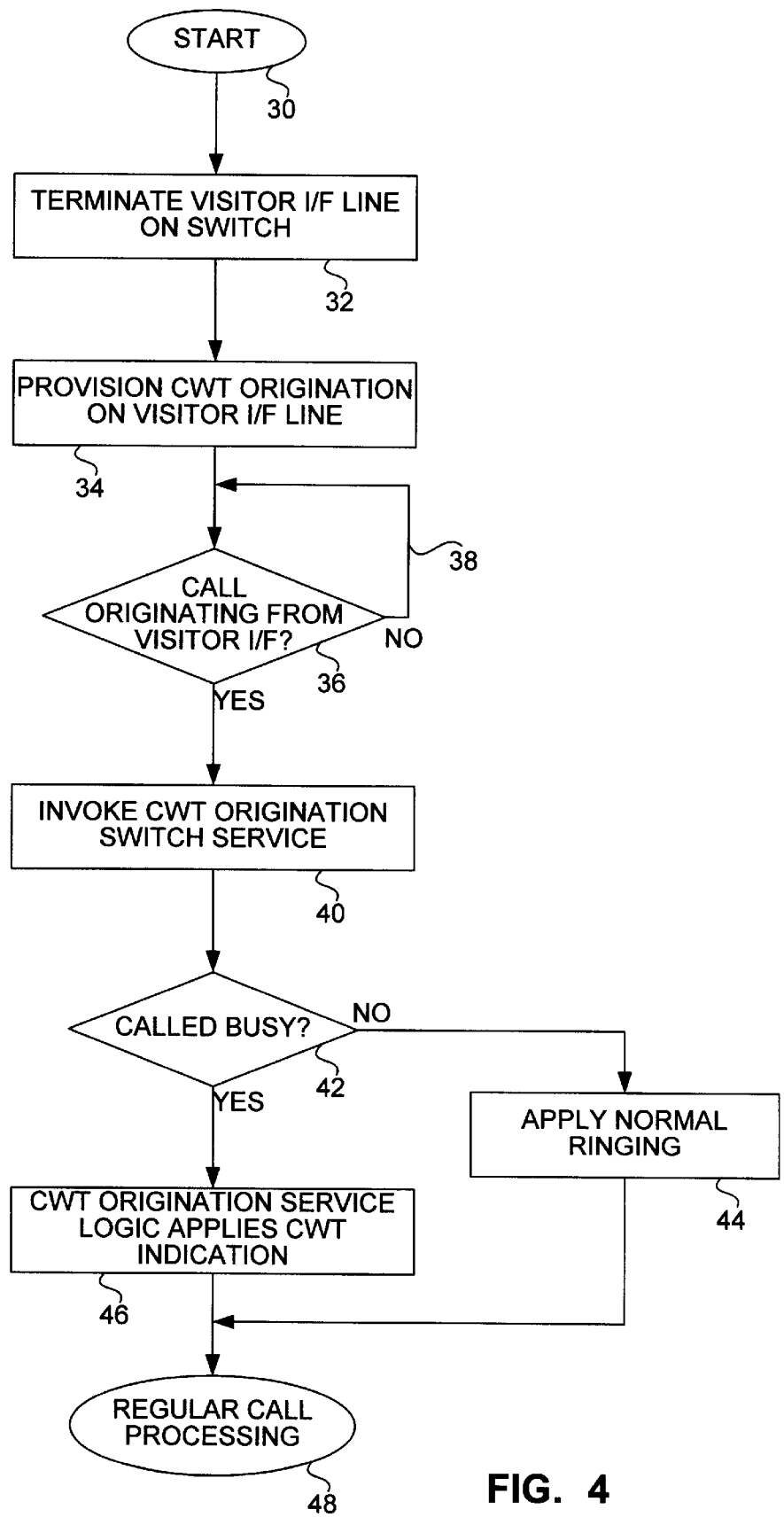
FIG. 4 illustrates in flow chart form method steps associated with a PSTN alerting system which utilizes a Call Waiting Origination switch service.

FIG. 4 illustrates in flow chart form, method steps associated with a PSTN alerting system which utilizes just a Call Waiting Origination switch service to provide for call waiting capabilities. The flow chart of FIG. 4 is entered at block 30. The visitor interface line 12 is terminated at step 32 on SSP 14 and the CWT Origination switch service is provisioned against the visitor interface line 12 at step 34. SSP 14 waits (step 36 and return arrow 38) for a call originating from the visitor I/F over the visitor interface line 12. In response to receiving the originating call over line 12 to a Called Party (which can only be a resident of the apartment building) the Call Waiting Origination switch service is invoked at step 40. The SSP 14 at step 42 determines if the line associated with the Called Party is busy. If the SSP 14 determines that the Called Party line is idle, Call Waiting Origination service logic causes the SSP 14 to apply normal ringing to the line. If however the SSP 14 determines that the Called Party line is busy, the Call Waiting Origination service logic causes the SSP 14 to apply a normal call waiting indication to the line. Regular call processing follows in the event the call is answered by the resident (called party) or either the visitor or the resident end the call by going on hook.

Figure 5:
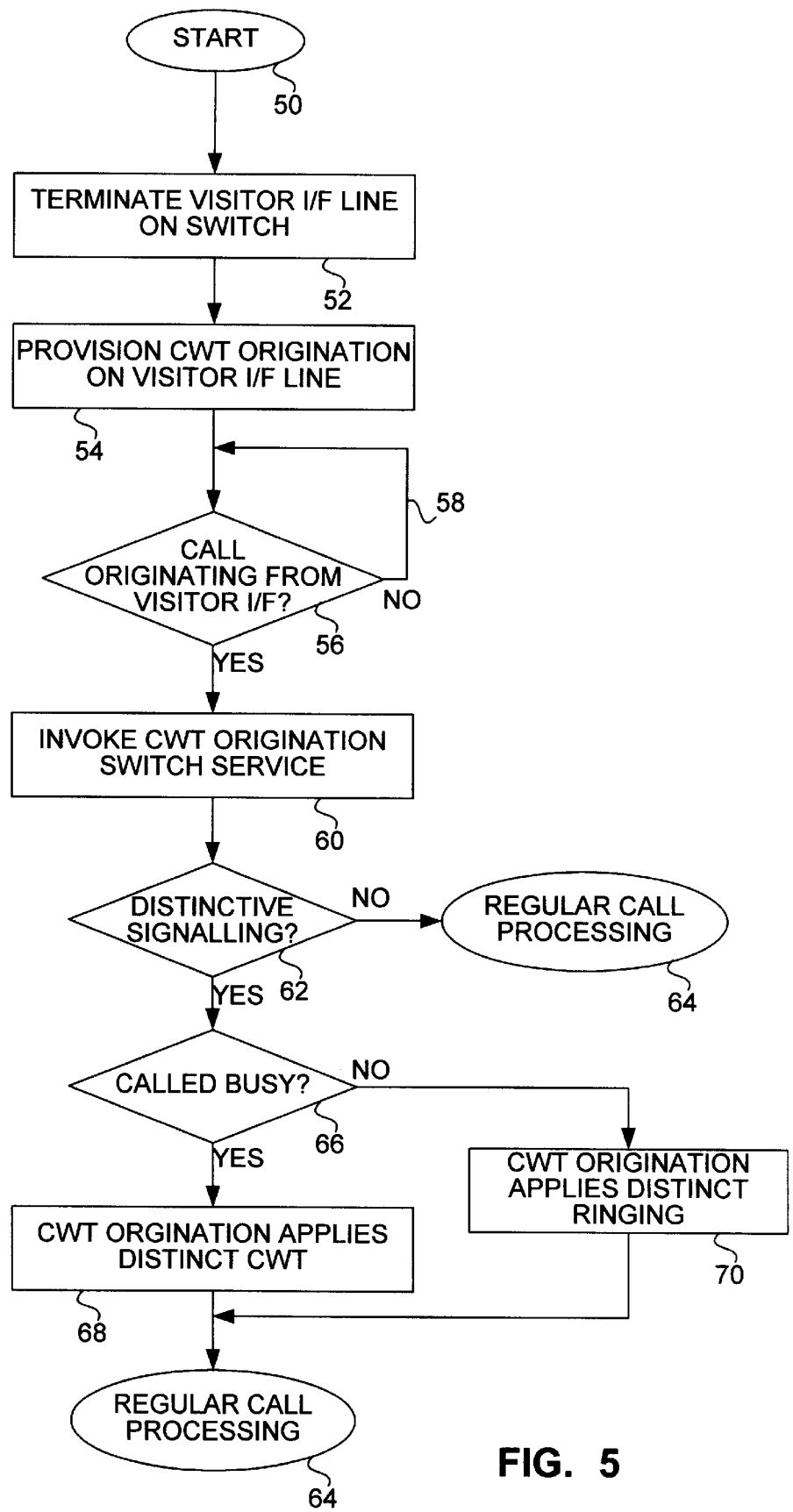
FIG. 5 illustrates in flow chart form method steps associated with a PSTN alerting system which utilizes a Call Waiting Origination switch service in combination with an AIN supported distinctive signalling service to provide distinctive ringing or distinctive call waiting service to residents.

FIG. 5 illustrates in flow chart form method steps associated with a PSTN alerting system which utilizes a Call Waiting Origination switch service in combination with an AIN supported distinctive signalling service to provide distinctive ringing or distinctive call waiting service to residents. Steps 50–60 of FIG. 5 correspond directly to just described steps 30–40 of FIG. 4. At step 62, SSP 14 determines if the visitor interface line 12 subscribes to the distinctive signalling service by querying a data base (SCP 20, FIG. 1). As was described with reference to FIG. 2 and FIG. 3, the AIN provisioned Off_Hook_Delay trigger on the visitor interface line 12, initiates the data base query in response to the incoming call reaching a predetermined point in the call processing. Where the line 12 does not subscribe to the Distinctive Signalling service, the SCP 20 returns an AIN response message indicating such and SSP 14 at step 64 provides regular call processing which follows from step 42–48 of FIG. 4. Where the line 12 does subscribe to the Distinctive Signalling service, step 62 further includes the SCP 20 returning an AIN response message which as has been described with reference to FIG. 2 and FIG. 3, includes a parameter having a 'Distinctive Alerting Sequence'. The SSP 14 at step 66 determines if the called party associated with the incoming call is busy. In response to the called party being determined not to be busy (i.e. idle), the CWT origination switch service using the Distinctive Alerting Sequence contained in the AIN response message, causes the SSP 14 at step 70 to apply distinctive ringing to the called party. In response to the called party being determined to be busy, the CWT origination switch service using the Distinctive Alerting Sequence contained in the AIN response message, causes the SSP 14 at step 68 to apply a distinctive call waiting indication to the called party. In known manner, regular call processing follows at step 64 in the event the call is answered by the resident (called party) or either the visitor or the resident end the call by going on hook.

Both residents and owners of apartment buildings benefit from a PSTN apartment alerting system which is capable of conveniently providing distinctive ringing and distinctive call waiting on calls originating from visitors to the building.

Residents benefit greatly with distinctive alerting and distinctive call waiting as residents are able to determine from the distinctive alerting signal (usually ringing) or from the distinctive call waiting indication (usually a tone sequence) that the incoming call is from a visitor. Distinguishing visitor incoming calls from regular PSTN incoming calls in this manner allows residents to be made aware of a visitor prior to taking the actual call. It is expected that fewer visitors will be left waiting in lobbies for reasons that a resident for various reasons decided not to take an incoming call. Residents enjoy all of the advantages of a direct wired alerting system without the inherent disadvantages of such systems.

We claim:

1. A method of alerting residents of a building comprising the steps of:
   terminating on a switch a first telephone line associated with a visitor interface;
   provisioning a call waiting origination switch service against the first telephone line;
   in response to receiving at said switch a call to a Called Party originating on said first telephone line, the switch invoking said provisioned call waiting origination switch service; and
   in response to determining that a second telephone line associated with the Called Party is busy, switch logic associated with said call waiting origination switch service then causing said switch to apply a call waiting indication to the second telephone line.

2. A method as claimed in claim 1 further comprising the step of determining that said first line subscribes to a distinctive signalling service and in response to determining that the second telephone line is busy, the switch logic causing said switch to apply a distinctive call waiting indication to the second telephone line.

3. The method as claimed in claim 1 further comprising the step of determining that said first line subscribes to a distinctive signalling service and in response to determining that the second telephone line is idle, the switch logic causing said switch to apply a distinctive ringing indication to the second telephone line.

4. A method as claimed in claim 2 wherein the step of determining that said first line subscribes to a distinctive signalling service comprises provisioning a switch originating trigger against said first line and in response to the incoming call the originating trigger causing said switch to query a database.

5. A method as claimed in claim 4 wherein the step of provisioning a switch originating trigger comprises provisioning an AIN Off_Hook_Delay trigger and wherein said trigger causes said switch to query a Service Control Point.

6. A method as claimed in any of claims 2–5 further comprising the step of in response to the switch receiving an indication from the second telephone line to take the incoming call, the switch providing a voice connection between first and second lines.

7. A method as claimed in claim 3 wherein the step of determining that said first line subscribes to a distinctive signalling service comprises provisioning a switch originating trigger against said first line and in response to the incoming call the originating trigger causing said switch to query a database.

8. A method as claimed in claim 7 wherein the step of provisioning a switch originating trigger comprises provisioning an AIN Off_Hook_Delay trigger and wherein said trigger causes said switch to query a Service Control Point.

9. A method as claimed in claim 7 or 8 further comprising the step of in response to the switch receiving an indication from the second telephone line to take the incoming call, the switch providing a voice connection between first and second lines.

10. A telephony switch interconnected with a building visitor interface by way of a telephone line, said telephony switch configured to provide a call waiting origination service for said telephone line, enabling all telephone calls originating with said visitor interface to residents of said building to initiate provision of call waiting indications.

11. The telephony switch of claim 10, wherein said telephony switch is further provisioned to initiate a distinctive call waiting indication for said calls originating with said visitor interface.

12. The telephony switch of claim 10, wherein said switch is connected to an advanced intelligent network (AIN) and said call waiting indications are provided using an AIN Off_Hook_Delay trigger.

13. The telephony switch of claim 10, wherein said switch is connected to an advanced intelligent network (AIN) and providing said call waiting indication includes using an AIN Off_Hook_Delay trigger.

* * * * *